(12) United States Patent
Neugebauer et al.

(10) Patent No.: US 9,175,171 B2
(45) Date of Patent: Nov. 3, 2015

(54) METHACRYLATE RESINS FOR PRODUCING ROAD MARKINGS

(75) Inventors: Peter Neugebauer, Limburg (DE); Günter Schmitt, Darmstadt (DE); Ingrid Kizewski, Hanau (DE); Dieter Raab, Rodenbach (DE); Heike Heeb, Erlensee (DE)

(73) Assignee: EVONIK ROEHM GmbH, Darmstadt (DE)

( * ) Notice: Subject to any disclaimer, the term of this patent is extended or adjusted under 35 U.S.C. 154(b) by 634 days.

(21) Appl. No.: 12/373,530

(22) PCT Filed: Jul. 23, 2007

(86) PCT No.: PCT/EP2007/057547
§ 371 (c)(1),
(2), (4) Date: Jan. 13, 2009

(87) PCT Pub. No.: WO2008/022861
PCT Pub. Date: Feb. 28, 2008

(65) Prior Publication Data
US 2009/0253845 A1 Oct. 8, 2009

(30) Foreign Application Priority Data
Aug. 25, 2006 (DE) .......................... 10 2006 039 849

(51) Int. Cl.
C08K 3/26 (2006.01)
C08K 3/30 (2006.01)
C09D 4/06 (2006.01)

(52) U.S. Cl.
CPC ....................... C09D 4/06 (2013.01)

(58) Field of Classification Search
CPC .......... C08F 220/14; C08K 3/26; C08K 3/30; C08L 33/12; C09D 4/06
USPC ........... 427/136, 138; 523/172; 524/507, 555, 524/423, 425, 493, 494, 533, 535
See application file for complete search history.

(56) References Cited

U.S. PATENT DOCUMENTS

| 5,548,001 A | 8/1996 | Podszun et al. |
| 6,211,260 B1 * | 4/2001 | Nakamura et al. .............. 522/14 |
| 6,509,086 B1 | 1/2003 | Schroder et al. |
| 2002/0002259 A1 | 1/2002 | Quis et al. |
| 2003/0099819 A1 | 5/2003 | Schroder et al. |
| 2004/0253383 A1 | 12/2004 | Belik et al. |

FOREIGN PATENT DOCUMENTS

| DE | 198 26 412 | 12/1999 |
| DE | 199 02 683 C 1 | 11/2000 |
| EP | 0 442 326 A2 | 8/1991 |
| EP | 0 965 619 | 12/1999 |
| JP | 8-245732 A | 9/1996 |
| JP | 8-301953 A | 11/1996 |
| JP | 2000-119353 A | 4/2000 |
| JP | 2004-231762 * | 8/2004 ............. C08G 18/67 |
| WO | 03 053596 | 7/2003 |
| WO | WO 2007/017434 A1 | 2/2007 |

OTHER PUBLICATIONS

Triflex System Price List 2004—excerpt, 8 pages.
Triflex German-Language Catalogue "Living Life Outside"—excerpt, 2003, 6 pages.
Hermann Kaschuba, Declaration in lieu of oath, Sep. 9, 2010, 1 page.
Exhibit bundle "Bauplus". Sep. 3. 2010, 2 pages.
Exhibit bundle "Meeklenkamp", Jan. 16, 2006, 3 pages.
Office Action issued Sep. 12, 2010 in EP Application No. 07 787 792.6 (with English translation).
U.S. Appl. No. 13/384,063, filed Jan. 13, 2012, Neugebauer, et al.
U.S. Appl. No. 13/392,991, filed Feb. 28, 2012, Muehlbach, et al.
U.S. Appl. No. 13/499,184, filed Mar. 29, 2012, Muehlbach, et al.
U.S. Appl. No. 14/127,799, filed Dec. 19, 2013, Hilf, et al.
U.S. Appl. No. 13/978,481, filed Jul. 5, 2013, Hilf, et al.
Office Action issued Sep. 4, 2013 in Canadian Patent Application No. 2,660,096.
Office Action issued Dec. 7, 2012 in Japanese Patent Application No. 2009-526013 submitting German translation only.
U.S. Appl. No. 13/517,186, filed Jun. 19, 2012, Neugebauer, et al.

* cited by examiner

*Primary Examiner* — David W Wu
*Assistant Examiner* — Marie Reddick
(74) *Attorney, Agent, or Firm* — Oblon, McClelland, Maier & Neustadt, L.L.P.

(57) ABSTRACT

The invention relates to methacrylate resins and to their use.

17 Claims, No Drawings

METHACRYLATE RESINS FOR PRODUCING ROAD MARKINGS

CROSS-REFERENCE TO RELATED APPLICATIONS

The present application is a 35 U.S.C. §371 National Stage patent application of International patent application PCT/EP07/57547, filed on Jul. 23, 2007, which claims priority to German patent application 10 2006 039 849.1, filed on Aug. 25, 2006.

The invention relates to methacrylate resins and to their use.

Alongside methyl methacrylate, prepolymers, polymers and multifunctional monomer units, acrylates, such as n-butyl acrylate or ethylhexyl acrylate, are also used for production of extrusion resin systems and of spray resin systems, for flexible crosslinking.

Constitution has a decisive effect on feasible application temperatures.

There are therefore many different systems.

DE 1769792 uses from about 30 to 70% by weight of methyl methacrylate, from about 10 to 25% by weight of a copolymer of vinyl chloride with vinyl acetate, plasticizers, paraffins and esters of phosphorous acid as a composition for covering, coating and filling.

WO 01/18102 describes resin mixtures with additives which are intended to reduce the shrinkage of the resin. Hydroxyethyl methacrylate is used alongside propylene glycol, an acid and anhydrides.

Most systems listed generate a strong odour. DE 19826412 discloses a reduced-odour, cold-curing reactive (meth)acrylate resin for floor coatings composed of (meth)acrylates, which also contain comonomers, vinylaromatics or vinyl esters.

Acrylates are monomers which have high vapour pressure, their odour therefore being readily discernable. Compliance with maximum workplace concentrations is required during handling of acrylates.

It was an object to provide resins in which the use of acrylates is not necessary. Another intention is that hardening be rapid, and that the applications have maximum temperature latitude available.

The object has been achieved via reactive resins based on methacrylate containing
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
from 0 to 5% by weight of accelerators
and of other auxiliaries and additives.

It has been found that these reactive resins are an excellent basis for formulations which are usually used for road markings and floor coatings.

Surprisingly, it has been found that the use of acrylates is not necessary. It has been found that the use of urethane (meth)acrylates can decisively improve the property profile of the reactive resins. Reactive resins based on methacrylate with urethane (meth)acrylate exhibit markedly reduced odour, since the volatile constituents are eliminated. Furthermore, the methacrylate resins exhibit good flexibility with high mechanical stability. They moreover have excellent flow properties and excellent surface properties.

It has been found that the reactive resins are suitable not only for sprayable resin systems but also for extrusion resin systems. The processor can therefore easily use various processing technologies with a reactive resin mixture. The viscosities are about 10-5000 mPas.

It has also been found that the resins can be processed with wide temperature latitude of from 5 to 55° C.

"(Meth)acrylate" here means not only methacrylate, e.g. methyl methacrylate, ethyl methacrylate, etc., but also acrylate, e.g. methyl acrylate, ethyl acrylate, etc., mixtures of the two.

One particularly preferred embodiment is a reactive resin whose constitution is
from 3 to 10% by weight of urethane (meth)acrylates,
from 35 to 45% by weight of methyl methacrylates,
from 25 to 35% by weight of (meth)acrylic polymers and/or of comonomers,
from 0 to 3% by weight of crosslinking agents,
from 0 to 3% by weight of accelerators
and of other auxiliaries and additives.

Auxiliaries and additives used comprise chain transfer agents, plasticizers, stabilizers/inhibitors, waxes, oils, activators and/or antifoams. (Meth)acrylic polymers and/or comonomers are added to improve polymerization properties, mechanical properties, adhesion to the substrate, and the optical properties of the resins. The (meth)acrylate polymers and/or comonomers are selected from the acrylic polymers, methacrylic polymers, acrylic-methacrylic polymers, styrene acrylates, urethane (meth)acrylates, these having been prepared via bulk polymerization, emulsion polymerization, suspension polymerization or solution polymerization. Crosslinking agents used are in particular polyfunctional methacrylates such as allyl methacrylate, ethylene glycol dimethacrylate, diethylene glycol dimethacrylate, triethylene glycol dimethacrylate, tetraethylene glycol dimethacrylate, polyethylene glycol dimethacrylate, 1,3-butanediol dimethacrylate, 1,4-butanediol dimethacrylate, 1,6-hexanediol dimethacrylate, 1,12-dodecanediol dimethacrylate, glycerol dimethacrylate, trimethylolpropane trimethacrylate.

Accelerators/activators that can be used comprise the commercially available accelerators, such as aromatic-substituted tertiary amines. Chain transfer agents can also be used. S-Methacrylates are preferably used.

Examples of other suitable auxiliaries and additives are paraffins.

Preferred plasticizers used are esters, polyols, oils or phthalates. From the stabilizer/inhibitors group, it is preferable to use substituted phenols, hydroquinone derivatives, phosphines and phosphites.

Antifoams are preferably selected from the group of the alcohols, hydrocarbons, paraffin-based mineral oils, glycol derivatives, and derivatives of glycolic esters, of acetic esters and of polysiloxanes.

It has been found that reactive resins according to Claim 1 can be used in formulations which can moreover comprise dyes, glass beads, fine and coarse fillers, wetting agents, dispersing agents and flow-control agents, UV stabilizers, and rheology additives.

Auxiliaries and additives preferably added for the field of application of the reactive resins as road marking or surface marking comprise dyes. Particular preference is given to white, red, blue, green and yellow inorganic pigments, titanium dioxide being particularly preferred.

Glass beads are preferably used in formulations for road markings and surface markings, as reflectant.

The diameters of the commercially available glass beads used are from 10 to 2000 μm, preferably from 50 to 800 μm. The glass beads can also be silanized to improve processing and adhesion.

Fine fillers and coarse fillers can moreover be added to the formulation. These materials also have an antislip function and are therefore particularly used in floor coatings.

Fine fillers have been used from the group of the calcium carbonates, barium sulphates, quartzes, powder quartzes, precipitated and fumed silicas, pigments and cristobalites.

Coarse fillers used comprise quartzes, cristobalites, corundums and aluminium silicates.

Wetting agents and dispersing agents and flow-control aids are preferably selected from the group of the alcohols, hydrocarbons, glycol derivatives, polyethers, polysiloxanes, polycarboxylic acids, saturated and unsaturated polycarboxylic amine amides, and derivatives of glycolic esters, of acetic esters and of polysiloxanes.

It is also possible to use conventional UV stabilizers. The UV stabilizers are preferably selected from the group of the benzophenone derivatives, benzotriazole derivatives, thioxanthonate derivatives, piperidinolcarboxylic ester derivatives or cinnamic ester derivatives.

Rheology additives used preferably comprise polyhydroxycarboxamides, urea derivatives, salts of unsaturated carboxylic esters, alkylammonium salts of an acidic phosphoric acid derivative, ketoximes, amine salts of p-toluenesulphonic acid, amine salts of sulphonic acid derivatives and aqueous or organic solutions or mixtures of the compounds. It has been found that rheology additives based on fumed or precipitated silicas whose BET surface area is from 10 to 700 $nm^2/g$ are particularly suitable. It has been found that rheology additives based on silanized fumed or precipitated silicas whose BET surface area is from 10 to 700 $nm^2/g$ can be also be used.

The inventive methacrylate resins can be used directly or for production of formulations for road markings and floor coatings, for example of asphalt, concrete and earthenware, and also on old coatings and markings for renovation. The resins and formulations harden via free-radical polymerization, which is initiated via peroxides or UV light or thermally.

The examples given below are given for better illustration of the present invention but do not restrict the invention to the features disclosed herein.

EXAMPLES

Example 1

Sprayable Cold Plastic

For production of a sprayable road-marking paint, composed of two components (resin A accelerated component; resin B unaccelerated component), which is processed in a ratio of 1:1 using familiar processing machinery, a methyl methacrylate resin composed of
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
from 0 to 5% by weight of accelerators
and of other auxiliaries and additives is produced for production of component A and a methyl methacrylate resin composed of
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
and of other auxiliaries and additives for production of component B.

These are subjected to final processing as follows to give finished formulations:

| Component A | |
|---|---|
| Resin A | 42.0% |
| DISPERBYK 163 | 0.3% |
| BYK 410 | 0.1% |
| Titanium dioxide | 10.0% |
| Fine filler | 47.6% |
| Component B | |
| Resin B | 42.0% |
| DISPERBYK 163 | 0.3% |
| BYK 410 | 0.1% |
| Titanium dioxide | 10.0% |
| Fine filler | 47.6% |

The viscosity of the finished paint components is about 2000 mPas, the density being 1.6 kg/l. Consumption is about 1.1 kg/m² for a layer thickness of 0.7 mm.

The formulations are suitable for applying paint with a layer thickness of from 0.3 to 0.8 mm.

First, 4.0% of hardener powder (50% strength dibenzoyl peroxide phlegmatized in phthalate) are stirred into the unaccelerated paint mixture (component B). The two components A and B are then placed in separate tanks of the spray machinery, which mixes the components in the ratio 1:1 and sprays them. Component B is storage-stable for a plurality of days at room temperature with hardener, but only for 1-2 hours at 55° C.

The pot lives and curing times at various temperatures are:

| Temperature (° C.) | Pot life (min) | Curing time (min) |
|---|---|---|
| +5 | 5 | 20 |
| +20 | 3 | 8 |
| +45 | 3 | 9 |

The formulation was applied using "ECOZET" processing machinery (600 μm layer thickness), and then 450 g/m² of "MEGALUX 600-800 MKT 18" glass beads (comprising corundum) were scattered on the material (type I). The marking has the following properties:

| Total residual monomers % | Shore D hardness | TABER H 22 abrasion 500 g- 1000 rpm | Slump (2% BPO powder) (2% BPO S.) | | Tensile bond strength on asphalt | HUNTERLAB Y whiteness |
|---|---|---|---|---|---|---|
| 0.15 | 56 | 0.12 | 9.0 cm | 9.0 cm | >2 N/mm² | 90.54 |

Susceptibility to wear and traffic-engineering properties were tested by the Bundesanstalt für Strassenwesen [Federal Highway Research Institute] (test number: 2005 1DY 10.11).

| Properties | Number of wheel traverses (millions) | | | | | | | |
|---|---|---|---|---|---|---|---|---|
| | 0 | 0.1 | 0.2 | 0.5 | 1.0 | 2.0 | 3.0 | 4.0 |
| Wear resistance (%) | 100 | 100 | 100 | 100 | 100 | 100 | 100 | 100 |
| Grip (SRT units) | 54 | 41 | 41 | 40 | 40 | 40 | 39 | 36 |
| Night visibility, dry (mcd*m − 2 *lx − 1) | 255 | 551 | 522 | 537 | 618 | 591 | 434 | 363 |
| Luminance coefficient Qd (mcd*m − 2 *lx − 1) | 250 | 226 | 219 | 222 | 245 | 236 | 229 | 223 |
| Standard colour coordinates | | x = 0.324 | | | | y = 0.344 | | |

Example 2

Cold Plastic

For production of an extrudable road-marking paint, composed of two components (resin A accelerated component; resin B unaccelerated component), which is processed in a ratio of 1:1 using familiar processing machinery, a methyl methacrylate resin composed of
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
from 0 to 5% by weight of accelerators
and of other auxiliaries and additives is produced for production of component A and a methyl methacrylate resin composed of
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
and of other auxiliaries and additives for production of component B.

These are subjected to final processing as follows to give finished formulations:

| Component A | |
|---|---|
| Resin A | 20.00% |
| BYK 410 | 0.10% |
| BENTONE 27 | 0.10% |

| -continued | |
|---|---|
| Titanium dioxide | 10.00% |
| Fine filler | 20.00% |
| Coarse filler | 25.00% |
| Reflective beads | 25.00% |
| Component B | |
| Resin B | 20.00% |
| BYK 410 | 0.10% |
| BENTONE 27 | 0.10% |
| Titanium dioxide | 10.00% |
| Fine filler | 17.50% |
| Coarse filler | 25.00% |
| Reflective beads | 25.00% |

The viscosity of the finished paint components is about 15000 mPas, the density being 1.85 kg/l. Consumption is about 3.7 kg/m$^2$ for a layer thickness of 2 mm.

The formulations are suitable for applying paint with a layer thickness of from 1.5 to 3 mm.

First, 4.0% of hardener powder (50% strength dibenzoyl peroxide phlegmatized in phthalate) are stirred into component B. The two components A and B are then placed in separate tanks of the extrusion machinery, which mixes the components in the ratio 1:1 and extrudes them. Component B is storage-stable for a plurality of days at room temperature with hardener, but only for 1-2 hours at 55° C.

The pot lives and curing times at various temperatures are:

| Temperature (° C.) | Pot life (min) | Curing time (min) |
|---|---|---|
| +5 | 7 | 17 |
| +20 | 3 | 8 |
| +45 | 4 | 12 |

The formulation was applied at 2 mm layer thickness using a Plastomarker, and then 400 g/m$^2$ of "SWARCO 600-800 MKT 18 3:1" glass beads were scattered on the material (type I). The marking has the following properties:

| Total residual monomers % | Shore D hardness | TABER H 22 abrasion 500 g- 1000 rpm | Slump (2% BPO powder) (2% BPO S.) | | Tensile bond strength on asphalt | HUNTERLAB Y whiteness |
|---|---|---|---|---|---|---|
| 0.03 | 48 | 0.15 | 7.2 cm | 7.2 cm | >2 N/mm$^2$ | 87.21 |

Susceptibility to wear and traffic-engineering properties were tested by the Bundesanstalt für Strassenwesen [Federal Highway Research Institute] (test number: 2005 1DY 10.12).

|  | Number of wheel traverses (millions) | | | | | | | |
|---|---|---|---|---|---|---|---|---|
| Properties | 0 | 0.1 | 0.2 | 0.5 | 1.0 | 2.0 | 3.0 | 4.0 |
| Wear resistance (%) | 100 | 100 | 100 | 100 | 100 | 100 | 100 | 100 |
| Grip (SRT units) | 62 | 44 | 44 | 41 | 40 | 40 | 37 | 36 |
| Night visibility, dry (mcd*m − 2 *lx − 1) | 267 | 523 | 567 | 569 | 554 | 544 | 446 | 372 |
| Luminance coefficient Qd (mcd*m − 2 *lx − 1) | 251 | 230 | 244 | 245 | 243 | 235 | 235 | 240 |
| Standard colour coordinates | | x = 0.326 | | | | y = 0.345 | | |

Example 3

"Agglomerate Structure", PATHFINDER®

For production of an extrudable road-marking paint of PATHFINDER® type, composed of two components (resin A accelerated component; resin B unaccelerated component), which is processed in a ratio of 1:1 using familiar processing machinery, a methyl methacrylate resin composed of
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
from 0 to 5% by weight of accelerators
and of other auxiliaries and additives is produced for production of component A and a methyl methacrylate resin composed of
from 0.1 to 15% by weight of urethane (meth)acrylates,
from 30 to 50% by weight of methyl methacrylates,
from 15 to 40% by weight of (meth)acrylic polymers and/or of comonomers,
from 0 to 10% by weight of crosslinking agents,
and of other auxiliaries and additives for production of component B.

These are subjected to final processing as follows to give finished formulations:

| Component A | |
|---|---|
| Resin A | 20.00% |
| BYK 410 | 0.30% |
| BENTONE 27 | 0.30% |
| Titanium dioxide | 10.00% |
| Fine filler | 24.40% |
| Reflective beads | 45.00% |

-continued

| Component B | |
|---|---|
| Resin B | 20.00% |
| BYK 410 | 0.30% |
| BENTONE 27 | 0.30% |
| Titanium dioxide | 10.00% |
| Fine filler | 24.40% |
| Reflective beads | 45.00% |

The viscosity of the finished paint components is about 9 cm by the DANIEL slump method. Consumption is about 1.6-3 kg/m².

First, 4.0% of hardener powder (50% strength dibenzoyl peroxide phlegmatized in phthalate) are stirred into component B. The two components A and B are then placed in separate tanks of the extrusion machinery, which mixes the components in the ratio 1:1 and extrudes them over a toothed roll. Component B is storage-stable for a plurality of days at room temperature with hardener, but only for 1-2 hours at 55° C.

The pot lives and curing times at various temperatures are:

| Temperature (° C.) | Pot life (min) | Curing time (min) |
|---|---|---|
| +5 | 8 | 18 |
| +20 | 3 | 8 |
| +45 | 3 | 11 |

The formulation was applied in the form of "agglomerate" using "Plastomarker Junior" machinery, consumption of material being about 3 kg/m²—the material then for scattering being Potters 3D-AC-05 (type I).

Susceptibility to wear and traffic-engineering properties were tested by the Bundesanstalt für Strassenwesen [Federal Highway Research Institute] (test number: 2005 1DY 10.13).

|  | Number of wheel traverses (millions) | | | | | | | |
|---|---|---|---|---|---|---|---|---|
| Properties | 0 | 0.1 | 0.2 | 0.5 | 1.0 | 2.0 | 3.0 | 4.0 |
| Wear resistance (%) | 100 | 100 | 100 | 100 | 100 | 100 | 100 | 100 |
| Grip (SRT units) | 56 | 51 | 48 | 48 | 46 | 45 | 43 | 42 |
| Night visibility, dry (mcd*m − 2 *lx − 1) | 282 | 355 | 335 | 316 | 335 | 356 | 298 | 299 |
| Night visibility, wet, 2% inclination | 295 | 120 | 221 | 70 | 66 | 81 | 122 | 114 |
| Luminance coefficient Qd (mcd*m − 2 *lx − 1) | 244 | 244 | 240 | 223 | 233 | 253 | 248 | 249 |
| Standard colour coordinates | | x = 0.332 | | | | y = 0.349 | | |

The invention claimed is:

1. A method, comprising:
   mixing 1 part of a resin composition (A) and 1 part of a resin composition (B) to form a mixed resin composition, and, after said mixing,
   contacting a road marking or a floor coating with said mixed resin composition to renovate the road marking or floor coating,
   wherein
   said resin composition (A) comprises, based on the total weight thereof,
   0.1 to 15% by weight of a urethane (meth)acrylate,
   30 to 50% by weight of a methyl methacrylate,
   15 to 40% by weight of at least one of an acrylic polymer, a methacrylic polymer, and an acrylic-methacrylic copolymer,
   0 to 10% by weight of a crosslinking agent, and
   above 0 to 5% by weight of an accelerator;
   said resin composition (B) comprises, based on the total weight thereof,
   0.1 to 15% by weight of a urethane (meth)acrylate,
   30 to 50% by weight of a methyl methacrylate,
   15 to 40% by weight of at least one of an acrylic polymer, a methacrylic polymer, and an acrylic-methacrylic copolymer, and
   0 to 10% by weight of a crosslinking agent;
   said resin composition (B) does not contain an accelerator; and
   at least one of said resin composition (A) and (B) further comprises glass beads, an inorganic pigment, and a rheological additive.

2. The method according to claim 1, wherein said resin composition (A) comprises, based on the total weight thereof,
   3 to 10% by weight of a urethane (meth)acrylate,
   35 to 45% by weight of a methyl methacrylate,
   25 to 35% by weight of at least one of an acrylic polymer, a methacrylic polymer, and an acrylic-methacrylic copolymer,
   0 to 3% by weight of a crosslinking agent, and
   above 0 to 3% by weight of an accelerator;
   said resin composition (B) comprises, based on the total weight thereof,
   3 to 10% by weight of a urethane (meth)acrylate,
   35 to 45% by weight of a methyl methacrylate,
   25 to 35% by weight of at least one of an acrylic polymer, a methacrylic polymer, and an acrylic-methacrylic copolymer, and
   0 to 3% by weight of a crosslinking agent.

3. The method according to claim 2, wherein the mixed resin composition further comprises at least one of a chain transfer agent, a plasticizer, a stabilizer, an inhibitor, a wax, an oil, an activator, and an antifoam.

4. The method according to claim 1, wherein the crosslinking agent comprises a polyfunctional methacrylate.

5. The method according to claim 1, wherein the crosslinking agent comprises at least one polyfunctional methacrylate selected from the group consisting of an allyl methacrylate; ethylene glycol dimethacrylate; diethylene glycol dimethacrylate; triethylene glycol dimethacrylate; tetraethylene glycol dimethacrylate; polyethylene glycol dimethacrylate; 1,3-butanediol dimethacrylate; 1,4-butanediol dimethacrylate; 1,6-hexanediol dimethacrylate; 1,12-dodecanediol dimethacrylate; glycerol dimethacrylate; and trimethylolpropane trimethacrylate.

6. The method according to claim 1, wherein the accelerator comprises an aromatic-substituted tertiary amine.

7. The method according to claim 1, wherein the mixed resin composition further comprises a fine filler that comprises at least one member selected from the group consisting of
   calcium carbonate, barium sulphate, quartz, powder quartz, precipitated silica, fumed silica, a pigment, and a cristobalite.

8. The method according to claim 1, wherein the mixed resin composition further comprises at least one member selected from the group consisting of an alcohol, a hydrocarbon, a glycol compound, a polyether, a polycarboxylic acid, a saturated polycarboxylic amine amide, an unsaturated polycarboxylic amine amide, a glycolic ester compound, an acetic ester compound, and a polysiloxane.

9. The method according to claim 1, wherein the mixed resin composition further comprises a UV stabilizer that comprises at least one member selected from the group consisting of
   a benzophenone compound, a benzotriazole compound, a thioxanthonate compound, a piperidinolcarboxylic ester compound and a cinnamic ester compound.

10. The method according to claim 1, wherein the mixed resin composition further comprises a rheology additive that comprises at least one member selected from the group consisting of
    a polyhydroxycarboxamide, a urea compound, a salt of an unsaturated carboxylic ester, an alkylammonium salt of an acidic phosphoric acid compound, a ketoxime, an amine salt of p-toluenesulphonic acid, an amine salt of a sulphonic acid compound, an aqueous solution thereof, and an organic solution thereof.

11. The method according to claim 1, wherein said inorganic pigment comprises titanium dioxide.

12. The method according to claim 1, wherein said glass beads comprise glass beads having diameters of from 10 to 2000 μm.

13. The method according to claim 1, wherein said glass beads comprise glass beads having diameters of from 50 to 800 μm.

14. The method according to claim 1, wherein said mixed resin composition comprises a rheological additive which comprises a fumed or precipitated silica having a BET surface area of from 10 to 700 nm$^2$/g.

15. The method according to claim 1, wherein said mixed resin composition comprises a rheological additive which comprises a silanized silica having BET surface area of from 10 to 700 nm$^2$/g.

16. The method according to claim 1, wherein said mixed resin composition has a density of from 1.6 to 1.85 kg/l.

17. The method according to claim 1, wherein said road marking is an old road marking.

* * * * *